US00RE45179E

(19) United States
(12) Reissued Patent
Bodkin et al.

(10) Patent Number: US RE45,179 E
(45) Date of Reissued Patent: Oct. 7, 2014

(54) PORTABLE DEVICE CASE WITH CORNER PROTECTOR

(71) Applicant: Speculative Product Design, LLC, Mountain View, CA (US)

(72) Inventors: Patrick M. Bodkin, Lombard, IL (US); Gregg Flender, Bedford, MA (US); Mike Tracz, Brecksville, OH (US)

(73) Assignee: Speculative Product Design, LLC, Mountain View, CA (US)

(21) Appl. No.: 13/843,310

(22) Filed: Mar. 15, 2013

Related U.S. Patent Documents

Reissue of:
(64) Patent No.: 8,073,131
Issued: Dec. 6, 2011
Appl. No.: 11/619,920
Filed: Jan. 4, 2007

U.S. Applications:
(63) Continuation of application No. 11/275,443, filed on Jan. 3, 2006, now Pat. No. 8,073,131.

(60) Provisional application No. 60/756,187, filed on Jan. 4, 2006, provisional application No. 60/641,204, filed on Jan. 3, 2005.

(51) Int. Cl.
*H04M 9/08* (2006.01)

(52) U.S. Cl.
USPC ..... 379/406.01; 190/119; 190/125; 206/6.1; 206/38.1; 206/303; 206/320; 224/197; 224/242; 224/250; 224/269; 224/675; 235/486; 248/176.1; 361/679.57; 379/433.01; 379/455; 396/27; 455/90.3; 455/550.1; 455/575.1; 455/575.8

(58) Field of Classification Search
CPC ..... H04M 1/0214; H04M 1/0264; H04M 1/0283; H04M 1/18; H04M 1/23
USPC ..... 206/38.1, 320, 6.1, 303; 224/197, 199, 224/250, 269, 242, 675; 235/486; 361/679.09, 679.57, 683; 379/406.01, 379/455; 396/27; 455/90.3, 550.1, 575.1, 455/575.8, 550, 90; 248/176.1
See application file for complete search history.

(56) References Cited

U.S. PATENT DOCUMENTS 3,081,672 A 3/1963 Anderson
4,071,065 A 1/1978 Halbich (Continued)

FOREIGN PATENT DOCUMENTS

CN 1306700 A 8/2001
EP 1096759 5/2001

(Continued)

OTHER PUBLICATIONS

Shock protection of portable electronic products: Shock response spectrum, damage boundary approach, and beyond Goyal, S. (Reprint); Papadopoulos, JM; Sullivan, PA AT&T Bell Labs, Lucent Technol, Wireless Res Lab, 600 Mt Ave, Rm 1b-212, Murray Hill, NJ.

(Continued)

*Primary Examiner* — Gerald Gauthier
(74) *Attorney, Agent, or Firm* — Frommer Lawrence & Haug LLP

(57) ABSTRACT

A case for a portable electronic device such as cell phones, cameras, MP3 players and PDAs wherein said case includes material at the corners to provide protection to the electronic device. To reduce bulk at the corners and allow the material forming the case to conform with the contours of the device, the protection at the corners includes strips of material defining apertures there between. The apertures provide reduction in bulk and allow the case to conform to the corners of the device therein. Alternately, the protection at the corners can be provided by other structures co-molded into the corners of the cases. Such structures include material that is of a reduced thickness than other material used in the case, or structures that are formed to conform to the corners of the case. Such structures can be joined to the material forming the panels of the case by co-molding.

28 Claims, 14 Drawing Sheets

(56) References Cited

U.S. PATENT DOCUMENTS

| | | | | |
|---|---|---|---|---|
| 4,512,095 | A | 4/1985 | Seely | |
| 4,536,979 | A | 8/1985 | Parkinson | |
| 4,775,083 | A * | 10/1988 | Burger et al. | 224/675 |
| 4,858,798 | A * | 8/1989 | Siddoway et al. | 224/242 |
| 4,896,787 | A | 1/1990 | Delamour et al. | |
| 4,901,852 | A * | 2/1990 | King | 206/320 |
| 4,993,866 | A | 2/1991 | Sugihara | |
| 5,025,921 | A * | 6/1991 | Gasparaitis et al. | 206/320 |
| 5,253,292 | A | 10/1993 | Fluder et al. | |
| 5,265,720 | A | 11/1993 | Meliconi | |
| 5,292,060 | A | 3/1994 | Focke | |
| 5,360,108 | A | 11/1994 | Alagia | |
| 5,380,119 | A | 1/1995 | Hadden | |
| 5,620,120 | A * | 4/1997 | Tien | 224/199 |
| 5,762,304 | A * | 6/1998 | Hyatt | 248/176.1 |
| 5,768,370 | A | 6/1998 | Maatta et al. | |
| 5,816,459 | A | 10/1998 | Armistead | |
| D401,055 | S | 11/1998 | Jayez | |
| 5,833,100 | A * | 11/1998 | Kim | 224/197 |
| 5,850,954 | A | 12/1998 | Dong-Joo | |
| 5,906,031 | A | 5/1999 | Jensen | |
| 5,908,114 | A | 6/1999 | Althouse et al. | |
| 5,988,577 | A | 11/1999 | Phillips et al. | |
| 6,029,871 | A | 2/2000 | Park | |
| 6,079,563 | A | 6/2000 | Katchmazenski | |
| 6,081,595 | A | 6/2000 | Picaud | |
| 6,082,535 | A * | 7/2000 | Mitchell | 206/320 |
| 6,109,434 | A | 8/2000 | Howard, Jr. | |
| 6,130,945 | A * | 10/2000 | Shin | 379/455 |
| 6,138,935 | A | 10/2000 | Zwayer et al. | |
| 6,141,417 | A | 10/2000 | Lopez et al. | |
| 6,179,122 | B1 | 1/2001 | Moncrief et al. | |
| D438,536 | S | 3/2001 | Willison et al. | |
| 6,233,788 | B1 | 5/2001 | Choy | |
| 6,273,252 | B1 * | 8/2001 | Mitchell | 206/320 |
| 6,305,588 | B1 | 10/2001 | Michel | |
| 6,315,255 | B1 | 11/2001 | Chan et al. | |
| 6,325,189 | B1 * | 12/2001 | King et al. | 190/119 |
| 6,341,217 | B1 * | 1/2002 | Wong | 455/575.5 |
| 6,405,910 | B1 | 6/2002 | Infanti | |
| 6,454,146 | B2 * | 9/2002 | Alis | 224/250 |
| 6,471,056 | B1 | 10/2002 | Tzeng | |
| 6,513,201 | B2 | 2/2003 | Beune | |
| 6,594,472 | B1 | 7/2003 | Curtis et al. | |
| 6,614,722 | B2 | 9/2003 | Polany et al. | |
| 6,665,174 | B1 | 12/2003 | Derr et al. | |
| 6,665,544 | B1 | 12/2003 | Michel et al. | |
| 6,665,909 | B2 | 12/2003 | Collins | |
| D484,874 | S | 1/2004 | Chang et al. | |
| 6,685,067 | B2 | 2/2004 | French | |
| 6,701,159 | B1 * | 3/2004 | Powell | 455/575.8 |
| 6,719,381 | B2 | 4/2004 | Cleereman | |
| 6,752,299 | B2 | 6/2004 | Shetler et al. | |
| 6,785,566 | B1 * | 8/2004 | Irizarry | 455/575.8 |
| 6,839,432 | B1 | 1/2005 | Martin | |
| 6,914,774 | B1 * | 7/2005 | Albertini et al. | 361/679.09 |
| 6,926,856 | B2 | 8/2005 | Hus et al. | |
| 6,953,110 | B2 * | 10/2005 | Santy et al. | 190/125 |
| 6,959,806 | B2 * | 11/2005 | Barker | 206/6.1 |
| 6,980,777 | B2 * | 12/2005 | Shepherd et al. | 455/90.3 |
| 6,981,589 | B2 | 1/2006 | Sanders, Jr. | |
| 7,050,712 | B2 * | 5/2006 | Shimamura | 396/27 |
| 7,050,841 | B1 * | 5/2006 | Onda | 455/575.8 |
| 7,079,879 | B1 * | 7/2006 | Sylvester et al. | 455/575.8 |
| 7,191,898 | B1 * | 3/2007 | Williams | 206/303 |
| 7,203,467 | B2 | 4/2007 | Siddiqui | |
| 7,236,588 | B2 * | 6/2007 | Gartrell | 379/433.01 |
| 7,248,904 | B2 * | 7/2007 | Gartrell et al. | 455/575.8 |
| 7,343,184 | B2 | 3/2008 | Rostami | |
| 7,360,707 | B2 | 4/2008 | Barkan et al. | |
| 7,399,136 | B2 | 7/2008 | Petrie et al. | |
| 7,428,427 | B2 | 9/2008 | Brunstrom | |
| 7,435,921 | B2 | 10/2008 | Rae | |
| 7,495,895 | B2 | 2/2009 | Carnevali | |
| 7,523,970 | B2 | 4/2009 | Konchan | |
| D593,319 | S | 6/2009 | Richardson et al. | |
| D593,746 | S | 6/2009 | Richardson et al. | |
| 7,551,949 | B2 | 6/2009 | Schworm | |
| 7,555,325 | B2 | 6/2009 | Goros | |
| 7,609,512 | B2 | 10/2009 | Richardson et al. | |
| 7,623,898 | B2 | 11/2009 | Holmberg | |
| 7,647,082 | B2 | 1/2010 | Holmberg | |
| D617,784 | S | 6/2010 | Richardson et al. | |
| 7,813,712 | B2 | 10/2010 | Yasuoka et al. | |
| 7,907,394 | B2 | 3/2011 | Johnson | |
| 7,933,122 | B2 | 4/2011 | Richardson et al. | |
| 7,938,260 | B2 | 5/2011 | Lin | |
| 8,073,131 | B2 * | 12/2011 | Bodkin et al. | 379/406.01 |
| 8,204,561 | B2 | 6/2012 | Mongan et al. | |
| 8,223,488 | B2 * | 7/2012 | Peter | 361/679.57 |
| 8,244,320 | B2 | 8/2012 | Lee | |
| 8,245,842 | B2 | 8/2012 | Bau | |
| 8,295,043 | B2 | 10/2012 | Tai | |
| 2001/0002003 | A1 * | 5/2001 | Kuzdak et al. | 206/38.1 |
| 2002/0076512 | A1 | 6/2002 | Kreider | |
| 2003/0036362 | A1 | 2/2003 | Buesseler et al. | |
| 2003/0068035 | A1 | 4/2003 | Pirila et al. | |
| 2003/0070959 | A1 | 4/2003 | Maresh et al. | |
| 2003/0083094 | A1 | 5/2003 | Hsu et al. | |
| 2003/0103624 | A1 * | 6/2003 | Hu | 379/455 |
| 2003/0111366 | A1 | 6/2003 | Enners | |
| 2003/0141329 | A1 * | 7/2003 | Huang | 224/197 |
| 2004/0014506 | A1 * | 1/2004 | Kemppinen | 455/575.1 |
| 2005/0035164 | A1 * | 2/2005 | Badillo | 224/269 |
| 2005/0139498 | A1 | 6/2005 | Goros | |
| 2005/0153757 | A1 * | 7/2005 | Maenpaa et al. | 455/575.8 |
| 2005/0174727 | A1 | 8/2005 | Thomas et al. | |
| 2005/0279661 | A1 | 12/2005 | Hodges | |
| 2006/0040550 | A1 | 2/2006 | Slauson et al. | |
| 2006/0091222 | A1 * | 5/2006 | Leung et al. | 235/486 |
| 2006/0164800 | A1 | 7/2006 | McEwan et al. | |
| 2006/0175370 | A1 | 8/2006 | Arney et al. | |
| 2006/0289030 | A1 | 12/2006 | Pho | |
| 2007/0085358 | A1 | 4/2007 | Robinson et al. | |
| 2007/0225031 | A1 * | 9/2007 | Bodkin et al. | 455/550.1 |
| 2009/0111543 | A1 | 4/2009 | Tai et al. | |
| 2010/0096284 | A1 | 4/2010 | Bau | |
| 2012/0031788 | A1 | 2/2012 | Morgan et al. | |

FOREIGN PATENT DOCUMENTS

| | | | |
|---|---|---|---|
| GB | 2463712 | A | 3/2010 |
| JP | 8018637 | | 1/1996 |
| JP | 2000139537 | | 5/2000 |
| JP | 2002027076 | | 1/2002 |
| KR | 200407284 | | 1/2006 |
| KR | 10-2008-0050555 | A | 6/2008 |
| WO | WO 94/28565 | | 12/1994 |
| WO | 1999067889 | A1 | 12/1999 |
| WO | WO 02/11161 | | 2/2002 |
| WO | 2008/032891 | A1 | 3/2008 |

OTHER PUBLICATIONS

Improving impact tolerance of portable electronic products: Case study of cellular phones S. Goyal, S. Upasani and D.M. Patel Experimental Mechanics Cover Date: Mar. 18, 1999 Publisher: Springer Boston ISSN: 0014-4851 Subject: Engineering Start p. 43 End p. 52 vol.

Role of shock response spectrum in electronic product suspension design Goyal, S., Elko, Gary W., Buratynski, Edward K. The International Journal of Microcircuits and Electronic Packaging. vol. 23, No. 2, Second Quarter, 2000, pp. 182-190 ISSN: 1063-1674 Source:.

Designing best-in-class impact-tolerant cellular phones and other portable products Goyal, S., Upasani, Sanjay S., Patel, Dhiren M. Bell Labs Technical Journal. vol. 3, No. 3, 1998, pp. 159-174 DOI: 10.1002/bltj.2123 Source: http://dx.doi.org/10.1002/bltj.2123, 24 pp.

www.theclip.com/Innopocket-tab-with-Ultra-Clip-p-16261.html. Innopocket tab with Ultra Clip, publication date unknown (4 pages).

www.alternativewireless.com/horizontal.sub.--cell.sub.--phone. sub.--cases/-krusell-multidapt-system.html. Krusell Multidapt Cell Phone Belt Clip System, publication date unknown (5 pages).

(56) References Cited

OTHER PUBLICATIONS www.geek.com/news/geeknews/2005Feb/bpd20050301028039.htm, Geek.com Geen News—Mini-Review: RhinoSkin Dell Axim X50 Aluminum Hardcase, publication date unknown (12 pages).
Office Action dated Apr. 25, 2013 of Chinese Patent Appl. No. 201080006846.6 with translation (14 pages).
Decision on Institution of Inter Partes Review of U.S. Patent 8,204,561 dated Sep. 23, 2013 (Paper 16) of Case No. IPR2013-00197 (13 pages).
Deposition of David O. Kazmer, P.E., Ph.D., Aug. 14, 2013, 138 pages, ITC Investigation Nos. 33-TA-861 and 867 (consolidated).
Deposition of Tim Osswald, Ph.D., Aug. 21, 2013, 229 pages, ITC Investigation Nos. 33-TA-861 and 867 (consolidated).
Deposition of Curtis E. Peterson, Aug. 16, 2013, 138 pages, ITC Investigation Nos. 33-TA-861 and 867 (consolidated).
Deposition of James Shelton, Aug. 13, 2013, 131 pages, ITC Investigation Nos. 33-TA-861 and 867 (consolidated).
Expert Report of David O. Kazmer, P.E., Ph.D., Regarding Invalidity of U.S. Patent No. 8,204,561 (including exhibits), Jul. 22, 2013, 348 pages, ITC Investigation Nos. 33-TA-861 and 867 (consolidated).
Rebuttal Report of Tim Osswald, Ph.D., Regarding Validity of U.S. Patent No. 8,204,561 (including exhibits), Aug. 5, 2013, 120 pages, ITC Investigation Nos. 33-TA-861 and 867 (consolidated).
Initial Expert Report of Curtis E. Peterson Part 1 (Report and Exhibits A-G), Jul. 19, 2013, 174 pages, ITC Investigation Nos. 33-TA-861 and 867 (consolidated) [see also cite 20].
Supplemental Expert Report of Curtis E. Peterson (including exhibits), Jul. 19, 2013, 177 pages, ITC Investigation Nos. 33-TA-861 and 867 (consolidated).
Expert Report of James Shelton Regarding Invalidity of U.S. Patent No. 8,204,561 (including exhibits), Jul. 22, 2013, 66 pages, ITC Investigation Nos. 33-TA-861 and 867 (consolidated).
Witness Statement of David O. Kazmer, P.E., Sep. 10, 2013, 149 pages, ITC Investigation Nos: 33-TA-861 and 867 (consolidated).
Direct Witness Statemnent of Curtis E. Peterson, Sep. 10, 2013, 68 pages, ITC Investigation Nos. 33-TA-861 and 867 (consolidated).
Witness Statement of James Shelton, Sep. 10, 2013, 64 pages, ITC Investigation Nos. 33-TA-861 and 867 (consolidated).
Petition for Inter Partes Review Under 37 C.F.R. 42.100 by Superior Communications, Inc. filed Sep. 25, 2013 (including exhibit list and supporting non-patent literature exhibit not ready of record) of Case No. IPR2013-00626 (63 pages).
Declaration of Andrew S. Flior dated Sep. 25, 2013 (4 pages) [Exh. 1006 to cite 14].
Exhibit List for Petition for Inter Partes Review dated Sep. 25, 2013 [cite 14] (3 pages).
Amazon.com web print-outs referring to a black iPhone case provided by "Cozip" retrieved from the Wayback Machine (http://archive.org/web/web.php)(Cozip) [Exh. 1003 to cite 14].
Amazon.com web print-outs referring to a white iPhone case provided by "Cozip" retrieved from the Wayback Machine (http://archive.org/web/web.php)(Cozip) [Exh. 1009 to cite 14].
modmyi.com web print-out: http://modmyi.com/forums/accessory-review/143151-mini-review-cozip-iphone-case-pics. html [Exh. 1010 to cite 14].
Initial Expert Report of Curtis E. Peterson Part 2 (Exhibits H-R), Jul. 19, 2013, 103 pages, ITC Investigation Nos. 33-TA-861 and 867 (consolidated) [see cite 8].
Bernie Stritzke, Excerpts of Custom Molding of Thermoset Elastomers (2009).
Cambridge Dictionary of American English, Cambridge Univ Press, p. 631 (1999).
Order re Claim Construction, Foremost in *Packaging Systems* v. *Cold Chain Technologies, et al.,* U.S. District Court for the Central District of California, Case No. SACV05-24-JVS(MLGx), Docket No. 2 (Nov. 21, 2005), 2005, 30 pages.
Claim Construction Order, *Solannex, Inc.* v. *Miasole, Inc.,* U.S. District Court, Northern District of California, 5:11-cv-00171-PSG, filed Apr. 10, 2013, 2 pages.
Collins Dictionaries, Definition of permanently, pp. 1-3 (Apr. 4, 2013).
Commission Investigative Staff's Initial *Markman* Brief, pp. 1-31 (Apr. 24, 2013), ITC Investigation Nos. 337-TA-861 and 867 (consolidated).
Commission Investigative Staff's *Markman* Reply Brief, May 8, 2013, 26 pages, ITC Investigation Nos. 337-TA-861 and 867 (consolidated).
Commission Investigative Staff's Submission Regarding the Level of Skill of One of Ordinary Skill in the Art, May 29, 2013, 4 pages, ITC Investigation Nos. 337-TA-861 and 867 (consolidated).
Complainant Speculative Produce Design, LLC's Ground Rule 834 Reply Claim Construction Brief, May 8, 2013, 49 pages, ITC Investigation Nos. 337-TA-861 and 867 (consolidated).
Complainant Speculative Product Design, LLC's Disclosure of the Level of Ordinary Skill in the Art for the '561 Patent, May 29, 2013, 7 pages, ITC Investigation Nos. 337-TA-861 and 867 (consolidated).
Complainant Speculative Product Design, LLC's Ground Rule 8.4 Initial Claim Construction Brief, Apr. 24, 2013, 34 pages, ITC Investigation Nos. 337-TA-861 and 867 (consolidated).
Decision to Vacate and Remand, *State of California Dept. of Transportation* v. *Tycor Walls, Inc.,* 106 Fed. Appx. 709 (Fed. Cir. Jul. 15, 2004), 5 pages.
Declaration of Bryan Hynecek and Exhibit, May 7, 2013, 20 pages, ITC Investigation Nos. 337-TA-861 and 867 (consolidated).
Declaration of Curtis E. Peterson and Exhibit, Apr. 24, 2013, 12 pages, ITC Investigation Nos. 337-TA-861 and 867 (consolidated).
Declaration of Curtis E. Peterson, May 29, 2013, 2 pages, ITC Investigation Nos. 337-TA-861 and 867 (consolidated).
Declaration of David O. Kazmer P.E., Ph.D. on Defining One of Ordinary Skill with Respect to US Patent No. 8,204,561, May 29, 2013, 7 pages, ITC Investigation Nos. 337-TA-861 and 867 (consolidated).
Declaration of David O. Kazmer, P.E., Ph.D. in Support of Superior Communications, Inc.'s Opening Claim Construction Brief, 23 pages (Apr. 23, 2013), ITC Investigation Nos. 337-TA-861 and 867 (consolidated).
Declaration of David O. Kazmer, P.E., Ph.D. in Support of Superior Communications, Inc.'s Responsive Claim Construction Brief, May 8, 2013, 14 pages, ITC Investigation Nos. 337-TA-861 and 867 (consolidated).
Declaration of Dr. David O. Kazmer in Rebuttal to the Expert Declaration of Dr. Tim Osswald, May 17, 2013, 12 pages, ITC Investigation Nos. 337-TA-861 and 867 (consolidated).
Declaration of Dr. Tim Osswald in Reply to Declaration of Dr. Curtis E. Peterson, May 22, 2013, 8 pages, ITC Investigation Nos. 337-TA-861 and 867 (consolidated).
Declaration of Dr. Tim Osswald in Reply to Declaration of Dr. David Kazmer, May 22, 2013, 7 pages, ITC Investigation Nos. 337-TA-861 and 867 (consolidated).
Declaration of Dr. Tim Osswald in Support of Complainant Speculative Product Design, LLC's Ground Rule 8.4 Reply Claim Construction Brief, May 7, 2013, 15 pages, ITC Investigation Nos. 337-TA-861 and 867 (consolidated).
Declaration of Jennifer Bennett in Support of Complainant Speculative Product Design LLC's Ground Rule 8.4 Initial Claim Construction Brief, Apr. 24, 2013, 2 pages, ITC Investigation Nos. 337-TA-861 and 867 (consolidated).
Declaration of Philip J. Gaves in Support of Superior Communications, Inc.'s Opening Claim Construction Brief, pp. 1-3 (Apr. 24, 2013), (Exhibit E of Commission Investigative Staff Initial Markman Brief [Ref. 6]), ITC Investigation Nos. 337-TA-861 and 867 (consolidated).
Declaration of Philip J. Graves in Support of Superior Communications, Inc's Reply Claim Construction Brief, May 8, 2013, 2 pages, ITC Investigation Nos. 337-TA-861 and 867 (consolidated).
Email from J. Bennett of Dentons dated Apr. 22, 2013, "Follow-up to Apr. 22, 2013 call re: Markman", 1 pages (Exhibit E, Commission Investigative Staff's Initial *Markman* Brief [Cite 6]).
Ground Rule 8.3 Joint Claim Construction Chart, pp. 1-15 (Apr. 12, 2013), ITC Investigation Nos. 337-TA-861 and 867 (consolidated).
http://web.archive org/web/20081225012114/http://www.switcheasy.com/products/Rebel/Rebel.Php, pp. 1-3 (Oct. 17, 2011).

(56) References Cited

OTHER PUBLICATIONS http://web.archive.org/web/20051031111323/http://en.wikipedia.org/wiki/Injection_molding (Oct. 31, 2005).
http://web.archive.org/web/20070902012735/http://www.manufacturelink.com.au/processes/plasticmoulding-overmoulding.aspx (Sep. 2, 2007).
http://modmyi.com/forums/accessory-review/143151-mini-review-cozip-iphone-case-pics.html (May 2, 2008).
http://web.archive.org/web/20091013221721/http://terpconnect.umd.edu/~skgupta/M3T/MMMP.html.
http://web.archive.org/web/20071107144725/http://www.amazon.com/Apple-iPhone-Polycarbonate-Black-Cozip/dp/B000WHK3V2, Nov. 7, 2007.
http://web.archive.org/web/20080401100404/http://www.amazon.com/Apple-iPhone-Polycarbonate-Silver-Cozip/dp/B00104U134, Apr. 1, 2008.
http://web.archive.org/web/20081222050045/http://www.switcheasy.com/products/Neo/Neo.php, pp. 1-4 (Oct. 17, 2011).
http://www.cavtc.net/hkxy/jpkc/mjyy/jxzy/ckzI/200909/W020090917626295465463.swf (Sep. 2009).
http://www.glstpes.com/pdf/literature/Overmold%20Design%20Guide.pdf (Aug. 27, 2004).
http://www.glstpes.com/pdf/papers/Overmolding%20of%20Thermoplastic%20Elastomers%20Engineered%20solutions%20for%20consumer%20product%20differentiation.pdf (Jul. 14, 2007).
http://www.mierriam-webster.com/dictionary/one-piece (Apr. 2013).
http://www.mobiletechreview.com/iPod/iPhone-cases-review.htm, pp. 1-8 (Oct. 17, 2011).
http://www.theworldsbestever.com/2007/12/20/the-worlds-best-iphone-accessory/, Dec. 20, 2007.
http://www.tooling-press-release.com/Global/News/Articles/2005/Inclosia%20Signs%20EXO%20Technology%20Licensing%20Agreement%20with%20Mosen.htm (Jun. 24, 2005).
Order 13: Construing Terms of the Asserted Patent (Jul. 8, 2013), ITC Investigation Nos. 337-TA-861 and 867 (consolidated).
Osswad, et al., *Injection Molding Handbook,* p. 69, (2002), 2 pages.
Osswald, et al., *International Plastics Handbook, The Resource for Engineers,* (2006), pp. 124-125, 313-326, 341-343.
Kaysun Corporation Overmolding Whitepaper, available at http://www.kaysun.com/capabilities/overmolding/overmolding-white-paper?gclid=CPD96PGMirkCFQya4AodSH8AEg, 5 pages.
Kazmer, David O., *Injection Mold Design Engineering,* pp. 358-359, 362-363 (2007).
McGraw-Hill Dictionary of Scientific and Technical Terms, 6th Ed., McGraw-Hill Publishers, pp. 818-819, 956, 1137 & 1816 (2003).
Memorandum and Order, *Oki America, Inc.* v. *Advanced Micro Devices, Inc.,* 2006 WL 3290577 (N.D. Cal. Nov. 13, 2006), 14 pages.
Memorandum Opinion and Order Construing Certain Claims of U.S. Patents No. 4,279,947 (Goldman), No. 4,446,194 (Candaleria), No. 5,026,667 (Roberts), No. 5,479,084 (Yallup), and No. 5,040,144 (Pelley), *Motorola, Inc.* v. *Analog Devices, Inc.,* 2004 WL 5633734 (E.D. Tex. Mar. 23, 2004), 19 pages.
Order Construing Claims of U.S. Patent Nos. 6,928,734 and 7,032,314, *Trent West* v. *Quality Gold, Inc.,* U.S. District Court for the Northern District of California, 5:10-cv-03124-JF (HRL), E-filed Sep. 16, 2011, 19 pages.
Order Granting in Part and Denying Part Defendants' Motion for Symmary Jusgment of Non-Infringement; Denying as Moot Plaintiff's Motion to Strike Declaration of Steven Velinsky; Denying n Part as Moot and in Part as Premature Motion in Limine and Motion to Strike Proferred Testimony of Nelson Urdaneta; Dismissing in Part Counterclaims as Moot; Vacating Hearing, *Celerity, Inc.* v. *Ultra Clean Technology Systems and Service, Inc.,* 2007 WL 1202240 (N.D. Cal. Apr. 23, 2007), 11 pages.
Oxford Latin Dictionary, pp. 358 (1969).
Rebuttal Declaration of Curtis E. Peterson, May 16, 2013, 8 pages, ITC Investigation Nos. 337-TA-861 and 867 (consolidated).
Respondents Fellowes, Inc. and Body Glove International, LLC's Opening Brief on Claim Construction, pp. 1-28 (Apr. 24, 2013), ITC Investigation Nos. 337-TA-861 and 867 (consolidated).
Respondents Fellowes, Inc. and Body Glove International, LLC's Reply Brief on Claim Construction, May 8, 2013, 22 pages, ITC Investigation Nos. 337-TA-861 and 867 (consolidated).
Respondents' Submission Regarding Ordinary Skill in the Art, May 29, 2013, 13 pages, ITC Investigation Nos. 337-TA-861 and 867 (consolidated).
Rosato's Plastics Encyclopedia and Dictionary, Hanser Publishers, pp. 303 & 351 (1993).
S. Goyal et al., "Improving Impact Tolerance of Portable Electronic Products: Case Study of Cellular Phones", Experimental Mechanics, vol. 39, No. 1, pp. 43-52 (1999).
S. Goyal, et al., "Shock Protection of Portable Electronic Products: Shock Response Spectrum, Damage Boundary Approach, and Beyond," vol. 4, No. 3, pp. 169-191 (1977).
S. Goyal, et al., "Role of Shock Spectrum in Electronic Product Suspension Design," Outstanding paper of the International Conference and Exhibition on High Density Interconnect and Systems Packaging, The Intl. J. of Microcircuits and Electronic Packaging, vol. 23, No. 2, 2d Quarter, pp. 183-190.
S. Goyal, et al., "Designing Best-in-Class Impact-Tolerant Cellular Phones and Other Portable Products", Bell Labs Technical Journal, pp. 159-174 (Jul.-Sep. 1998).
Special Master's Report on Claim Construction Under *Markman* v. *Westview Instruments, Inc., Instituform Technologies, Inc.* v. *Amerik Supplies, et al.* v. *Cosmic-Sondermaschinenbau GmbH,* U.S. District Court, Northern District of Georgia, 1:08-cv-0333-TCB (Consolidated with Civil Action File No. 1:08-cv-0320), Oct. 8, 2009, 39 pages.
Superior Communications, Inc.'s Opening Claim Construction Brief, Apr. 24, 2013, 68 pages, ITC Investigation Nos. 337-TA-861 and 867 (consolidated).
Superior Communications, Inc.'s Reply Claim Construction Brief, May 8, 2013, 42 pages, ITC Investigation Nos. 337-TA-861 and 867 (consolidated).
The Random House Dictionary of the English Language, 2d Ed., pp. 717-718, and 726 (1987).
U.S. Patent and Trademark Office Technology Classification for "Co-molding plural fluent materials and uniting to preform", 2 pages.
Webster's II, New Riverside University Dictionary, pp. 477-478, 820-821 & 874-875 (1984).
Webster's Ninth New Collegiate Dictionary (1984).
Webster's Third New International Dictionary of the English Language Unabridged, pp. 849-850, 860, 1576 & 1683 (1961).
www.theclip.com/Innopocket-tab-with-Ultra-Clip-p-16261.html.
Innopocket tab with Ultra Clip, publication date unknown (4 pages).

* cited by examiner 10
30
21
45
15
25
226
212
20
210
36
46
35
37
220
200
39
230
222
214
216
225
5

PORTABLE DEVICE CASE WITH CORNER PROTECTOR

Matter enclosed in heavy brackets [ ] appears in the original patent but forms no part of this reissue specification; matter printed in italics indicates the additions made by reissue.

RELATED APPLICATION

This application claims priority to U.S. Provisional Application No. 60/756,157 filed on Jan. 4, 2006. The Application is also a continuation in part of U.S. Non-provisional application Ser. No. 11/275,443 filed on Jan. 3, 2006, which claims the benefit of U.S. Provisional Application No. 60/641,204, filed Jan. 3, 2005, the contents of which are incorporated herein by reference in their entirety.

FIELD OF THE INVENTION

This invention relates to carrying cases for portable electronic devices, such as cell phones, cameras, MP3 players, and PDAs. More particularly, the invention relates to cases having corner protectors. Further, the invention relates to a case for a clamshell type cellular phone. The invention also relates to methods for producing the case using a co-molding process.

BACKGROUND OF THE INVENTION

Cell phones, pagers, PDA's, MP3 players, and other portable electronic devices have become increasingly popular. Users of the devices like to keep the devices readily accessible on their person. Due to their portable nature, the devices are also subject to being dropped and otherwise roughly handled, which can result in damage to the electronics inside, or to the plastic housing of the device. To address the above concerns, cases have been developed to both carry and protect the portable electronic devices. These cases often include a clip or other retaining structure to allow the case to be removably attached to the user's clothing, such as a belt.

The clips or retainers commonly used are removeably attached to the case by fastening to a plastic post, which itself is attached to the case. The plastic post can be an integral part of the case, being formed of the same material as the case. In other prior art embodiments, the post is a separate piece, sewn into or otherwise permanently attached to the case. While this provides a secure attachment post for the clip, the post becomes a cumbersome and unwanted protrusion when the clip is removed. The case disclosed herein is provided with a detachable post, thereby providing a case unburdened with unnecessary protrusions. The case disclosed herein also provides an attachment point for other accessories such as a light, velcro, keychain or magnets.

The portable electronic cases of the prior art are generally constructed of leather, nylon, or other material provided in sheets. The material is cut to predetermine sizes to form panels, which are then sewn or otherwise attached to form a pocket for holding the portable electronic device. With this type of construction, if one desires parts of a panel to have different physical properties, such as elasticity, texture, color or clarity, different pieces of material must be physically joined to one another to create a panel having the desired characteristics. Typically, the materials are joined by stitching, heat weld, or adhesive. The seams created at the joints add unwanted bulk and add to the cost of construction. It is therefore desirable to produce a case that includes different physical properties, but does not require pieces to be mechanically joined. To that end, the case disclosed herein is constructed of a co-molded material.

For cases designed for clamshell devices, such as cellular phones, the prior art teaches cases having two detachable pocket sections. Each pocket section fits over a section of the clamshell phone and are then connected by a snap, zipper, or velcro. Because of the nature of the case materials, if the pocket sections were not detachable, there would be no way to place the case on the phone, as leather and nylon do not stretch sufficiently to allow one pocket to be placed on the phone and then have the other pocket placed on the phone. By use of the co-molded material described herein, sufficient elasticity may be incorporated into the case to allow the case to be constructed as a single unit. In other words, the two pockets do not have to be separable. Further, the elasticity of the material allows the case to give and fit the contours of the phone in a superior fashions when compared to the prior art.

SUMMARY OF THE INVENTION

The invention disclosed herein is an improvement for cases typically used with cell phones and portable electronic devices. Some of the cases described include cut out areas or apertures or areas without material at corners of the device. The apertures allow for reduced thickness and bulk where the case would normally cover the corners of the device. This aperture or open area allows the cell phone case to be constructed without the need to notch or dart the case material to allow the material to fit the curve of the corner of the cell phone or other portable device.

However, the resulting apertures are not without their problems. The apertures leave the corners of the cell phone exposed and unprotected. If the cell phone or other portable electronic device is dropped, the exposed corner of the device may be subject to impact with the ground, possibly resulting in damage of breakage of the device. Thus, it is object of the invention to provide protection to the cell phone or electronic device, while still providing a construction that eliminates or reduces the issues associated with sowing or otherwise bonding materials to fit a curved surface.

The disclosure describes an improved portable electronics case and a method of constructing the same. The cell phone case is formed of a co-molded material produced by pouring a first liquid plastic into a mold, and then pouring a second liquid plastic into the mold, the second plastic having physical characteristics different from the first. Once set, the material is removed from the mold and sewn to form pockets for the electronic device.

If the case is to be used for a clamshell type cellular phone, two pockets are formed, the pockets sharing a common or continuous panel Further, the disclosure describes a unitary case for clamshell phones, allowing for both donning and removal of the case onto the phone as a unit.

Further, the disclosure describes a case including a removable post or attachment point for a clip. The retainer used to hold the removable post, may be used to house other devices, such as a light, keychain, velcro, magnets, or other useful items.

DETAILED DESCRIPTION OF THE PREFERRED EMBODIMENT

Figures 1, 2, 3, 4, 5:
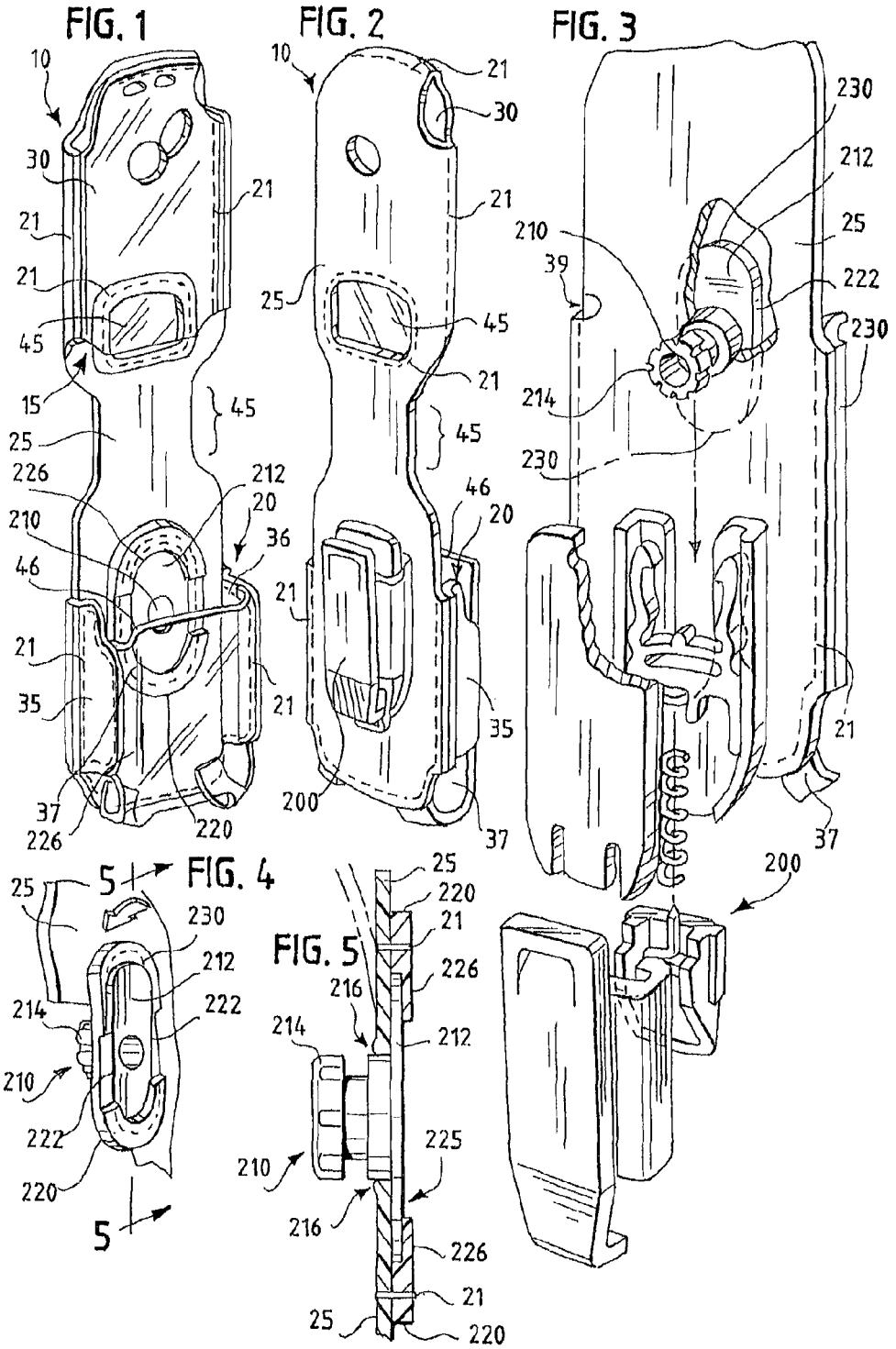
FIG. 1 is a perspective of a case for a clamshell phone, the case having a removable post.
FIG. 2 is a perspective view of a case for a clamshell phone, showing a clip.
FIG. 3 is a perspective view showing a clip and post interface.
FIG. 4 is a cutaway drawing showing removal of the post from the retainer.
FIG. 5 is a sectional view of FIG. 4.

Shown herein as the preferred embodiment is a case for a clamshell cellular phone. One skilled in the art will recognize the construction, materials, and methods can be applied to other cases for portable electronic devices, and need not be limited to the clamshell design shown in the figures. With reference to the figures, the case 10 includes a first pocket 15 and a second pocket 20 for receiving a portion of the cell phone 11. The case 10 includes a backbone panel 25. The backbone panel 25 forms part of both the first pocket 15 and the second pocket 20. The first pocket 15 includes a face sheet 30, made of a clear material allowing a user to see the display 31 of the cell phone 1, when the cell phone 11 is inserted into the first pocket 15. The face sheet 30 is attached to the backbone panel 25 about part of its perimeter to form the first pocket 15. In an alternate embodiment, intermediate side panels 35 and 36 (as used on the second pocket 20) are used to attach the backbone panel 25 to the face sheet 30. The various components forming the first pocket 15 are attached to one another using heat welding, adhesive, stitching 21, or any other construction method to join two materials known in the art. One skilled in the art will recognize that the pockets of the case 10 can be formed of any number of panels, so as to suit the shape of the phone 11 or other portable device.

As shown in FIG. 3, the panels may include a stress relief notch 39 or notches in alternate embodiments. The stress relief notch is a small cut out located in the perimeter of the panel immediately adjacent to areas where panels are joined or otherwise connected or stitched together. The stress relief notches allow the panel to stretch without overly stressing or stretching the stitched area. One skilled in the art will recognize the stress relief notches are optional, and may take on many different shapes. As shown in FIG. 3, the stress relief notch 39 is located adjacent the area where the backbone panel 25 and an intermediate side panel 36 are joined. It is preferred that the stress relief notches are approximately 2 to 4 millimeters wide and 2 to 4 millimeters deep. It is preferred the stress relief notches have a generally curved shape, so as to prevent formation of a stress riser as might be the case if the contours of the stress relief notch were angular. For instance, if the stress relief notch were shaped such that it included a vertex, when stressed or stretched, a tear in the panel material could begin at the vertex of the notch.

The backbone panel 25 can include a window 48 to allow a user to see the outside display of the cell phone 11. The window 48 is formed of a clear material. The window 45 is joined to the backbone panel 25 by heat welding, adhesive, or stitching 21, or any other construction know in the art. With a judicious selection of materials, the window 35 may be co-molded into the backbone panel 25 during the manufacture of the backbone panel 25, as described herein for other structures.

The second pocket 20 is formed in a similar fashion, by attaching the backbone panel 25 to a front panel 37 about portions of its perimeter. As shown in the drawings, the second pocket 20 includes side panels 35 and 36. One skilled in the art will recognize that many different configurations, panels, and places to attach the pieces together may be used to produce the first pocket 15 and second pocket 20.

The first pocket 15 and second pocket 20 are to be joined by a continuous piece of material; that is the first 15 and second 20 pocket are not attached by velcro, snaps, buttons, zippers, or any other structure which allows easy detachment and reattachment from and to one another. With the single or continuous panel forming part of both pockets, a backbone panel 25 is formed linking the two pockets.

Figure 6:
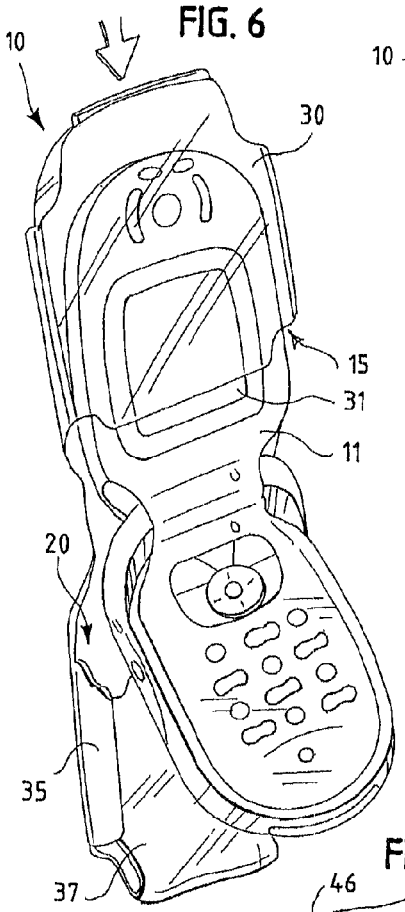
FIG. 6 is a perspective view showing the donning of the case onto a clamshell phone.
Figure 8:
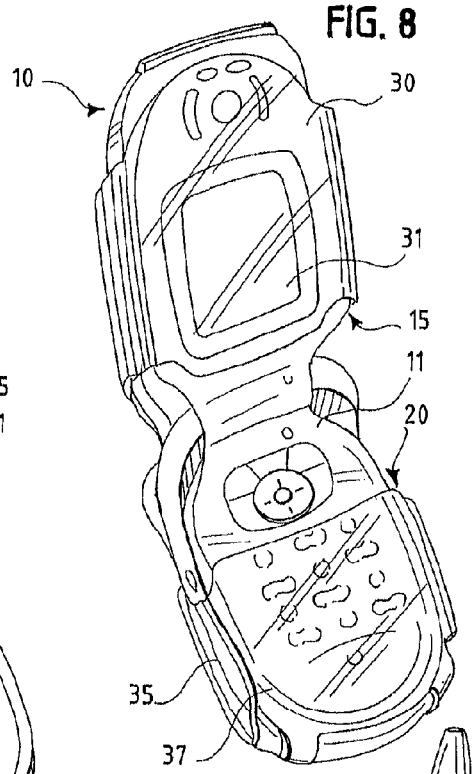
FIG. 8 is a perspective view showing the case on a clamshell phone.
Figure 7:
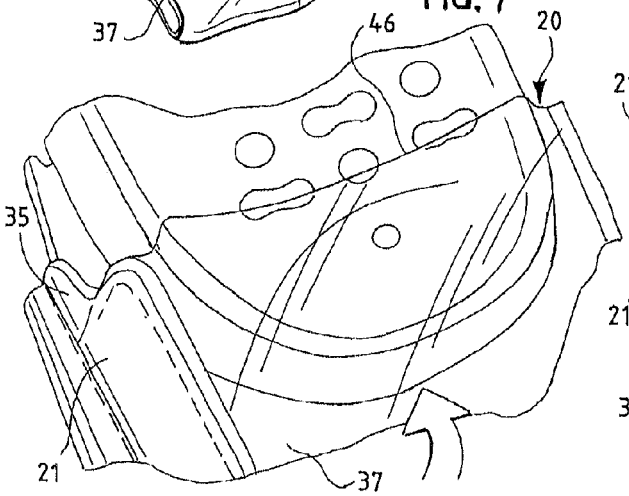
FIG. 7 is a perspective view showing the insertion of the phone into the second pocket.
Figure 9:
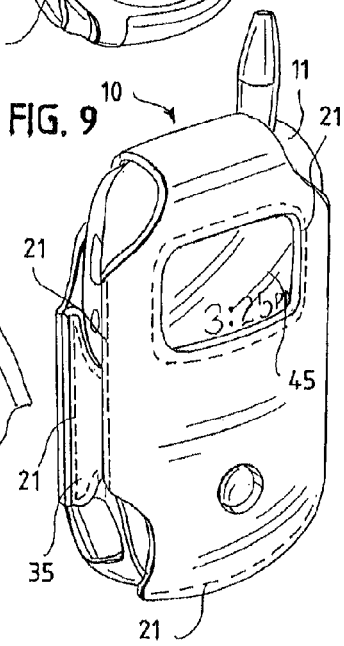
FIG. 9 is a perspective view showing the case on a closed clamshell phone

In use, the case 10 is placed onto the phone 11 by inserting part of the opened phone into one or the other of the first pocket 15 or the second pocket 20. Since the face sheet 30 is typically longer than the front panel 37, thereby creating a first pocket 15 that is deeper than the pocket formed by the front panel 37, when donning, it is preferable to insert the phone 11 into the first pocket 15 before inserting the phone into the second pocket 20, as shown in FIG. 6. The shorter length of the front panel 37 allows for easier insertion as the backbone panel 25 need not be stretched as far when compared to inserting the phone into the shorter pocket first. Unlike the prior art, which required the case to be separated into two pieces in order to be placed on the phone, the elasticity of the backbone panel 25 allows the case to be stretched far enough to allow both the first 15 and second 20 pockets to be placed on the cell phone 11 without the need to separate one pocket from the other. Thus, once the cover portion 40 of the cell phone 11 is inserted into the first pocket 15, the user stretches the backbone panel 25 until the edge 46 of the front panel 37 clears the body portion 47 of the cell phone 11, thereby allowing the body portion 47 to be inserted into the second pocket 20, as shown in FIG. 7, The user then releases the tension on the backbone panel 25, allowing the center portion 45 to contract, and draw the second pocket 20 over the body portion 47 of the phone 11, as shown in FIG. 8.

Although the backbone panel 25 forms part of both the first 15 and second 20 pockets, and is one continuous piece, it need not be a uniform or homogenous piece. In other words, the backbone panel 25 may be formed of a plurality of pieces or materials attached to each other by stitching, heat welding, adhesive, or other permanent attachment. For instance, the center portion 45 can be formed of an elastic material, while the portions forming the pockets 15, 20 can be of a less elastic material.

Figure 10:
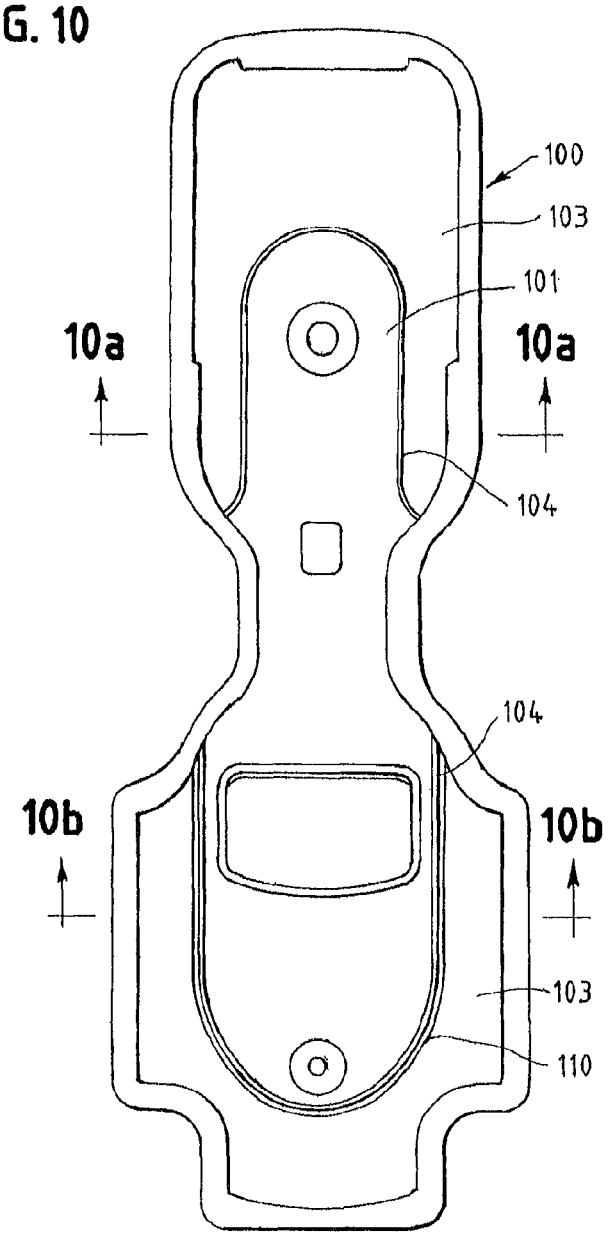
FIG. 10 is a top view of a mold for a case panel having a first texture portion, piping, and two non-texture portions.
Figure 10A:
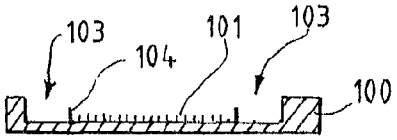
FIG. 10a is a cross sectional view of the mold.
Figure 10B:
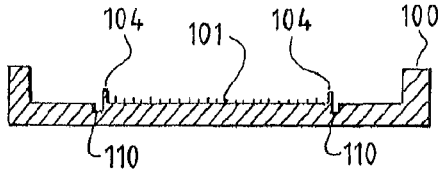
FIG. 10b is a second cross sectional view of the mold.

In the preferred embodiment, the backbone panel 25 is formed by co-molding. Other parts of the case may also be formed by this process. Co-molding allows the part or panel being manufactured to easily incorporate different properties, colors, textures, shapes or other characteristics, while allowing for efficient construction. To construct the backbone panel or other part, a mold 100 is constructed. As shown in FIG. 10, the mold 100 is a negative mold, typically machined from a metal, such as brass. One skilled in the art will recognize the mold 100 may be created in other ways. The mold 100 may include a textured area 101 having features such as cross hashing to improve grip, piping 111, or other physical treatment to produce and create different features upon the surface of the panel being manufactured. In some embodiments, the mold is deeper in some regions to create a thicker material in that region.

Figure 11:
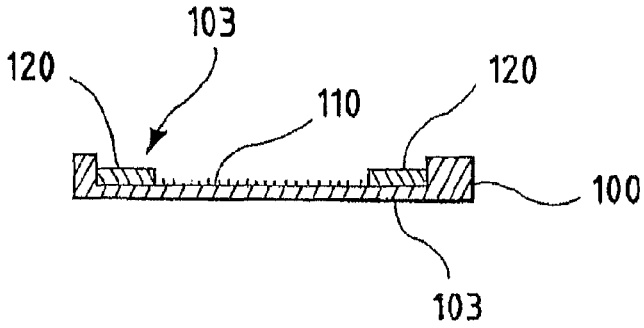
FIG. 11 is a cross sectional view of the mold showing a first substance or layer in the non-textured area of the mold.
Figure 12:
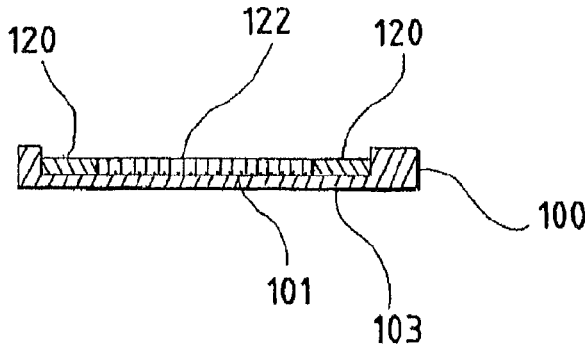
FIG. 12 is a cross-sectional view of the mold showing a second substance located in the textured area of the mold.
Figure 13:
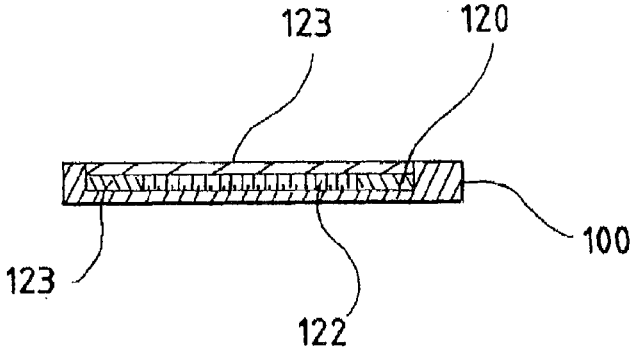
FIG. 13 is a cross-sectional of the mold showing third substance poured over the previous two substances.

As shown in FIGS. 11-13, the panel is created in layers. To make the panel, a first substance 120 is poured into the mold 100. In some instances the first substance 120 is the only substance used, but may be poured multiple times to cover and retain other structures such as a scrim, window, or reinforcement between the layers created. The first substance 120 and any other substance poured thereafter, may be a material such as silicone, thermosets and thermoplastics, including PVC, EPE, or any other material used in the polymer co-molding art. The first substance 120 may be poured to cover the entire mold 100 or only certain regions as shown in FIG. 11, depending upon the desired characteristics of the corresponding region of the panel.

Figure 14:
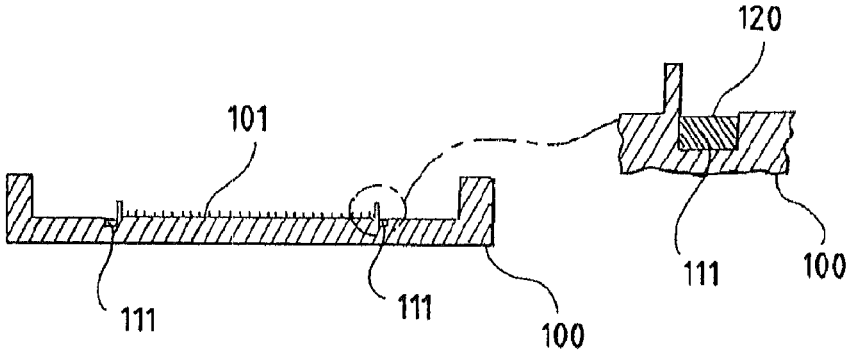
FIG. 14 is a cross-sectional view of the mold, including areas of piping, and showing a first substance poured into the piping.
Figure 15:
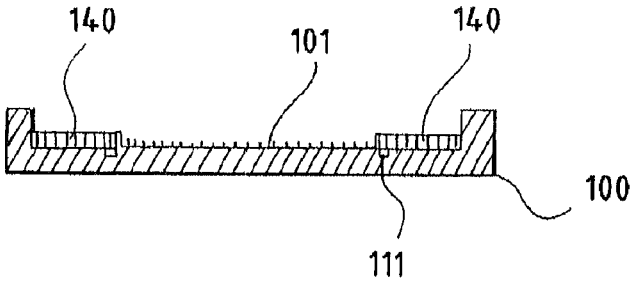
FIG. 15 is a cross-sectional view of the mold showing a second material layered over the piping in the first non-textured area of the mold.
Figure 16:
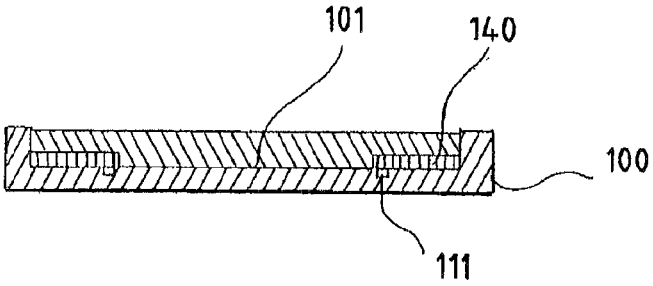
FIG. 16 shows a third substance layered over the previous two substances and overlaying the entire panel area of the mold.
Figure 17:
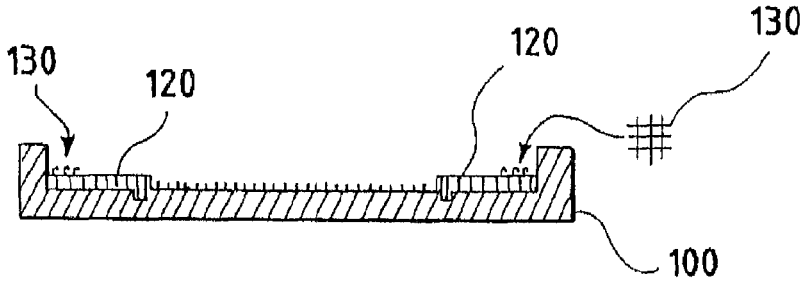
FIG. 17 is a cross-sectional view of the mold showing a first substance poured into the non-textured area of the mold showing a scrim located on top of the first substance.
Figure 18:
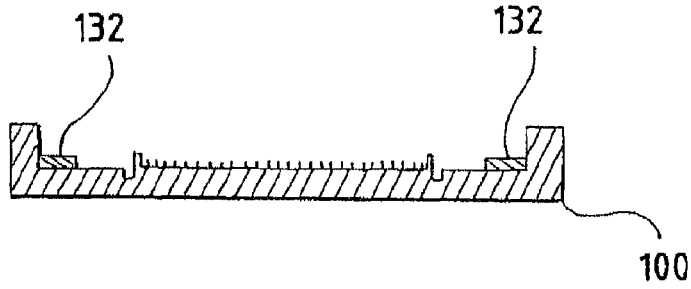
FIG. 18 is a cross-sectional view of the mold showing a reinforcement member placed into the mold about the perimeter.
Figure 19:
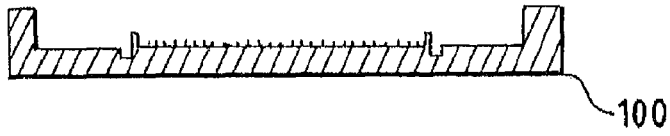
FIG. 19 is a cross sectional view of an empty mold.

For instance, the first substance 120 is placed in the mold 100 only in the area for piping 111, as shown in FIG. 14. In other embodiments, the first substance is placed only in the area for texture. One skilled in the art will recognize the variations are unlimited. The first substance 120 is poured to a depth to cover the piping 111, or other desired area but does not extend into the other areas where the substance is not desired. In this fashion, the first substance's 120 characteristics, such as color, will be applied only to the piping of the case or other article.

In the instance of the first substance 120 being EPE, the liquid EPE is placed in the desired area of the mold 100 at room temperature. The EPE is then spread out and forced into the desired areas, such as piping 111 or textured area 101, where air voids are likely. The mold 100 containing the EPE is then heated, and then cooled to room temperature.

The second material 140 is then poured. The second material 140 may have different properties than the first material 120. For instance, the second material 140 may be of a different color or texture. In some embodiments, the area of the mold 100 into which the second material 140 is poured may have a surface treatment or texture 101 to produce a surface texture on the finished product.

In a similar fashion, other pours may be made of either the same material, or different ones, until the panel having the desired characteristics is complete.

FIGS. 10 through 18 show sample configurations for panels manufactured using the co-molding process. As one skilled in the art will recognize, these are merely examples, other configurations are possible. FIG. 10 generally depicts a mold having a textured area 101, which will inpart a textured surface to the panel made in the mold. The textured area 101 is delineated from the non-textured area 103 by walls 104. Walls 104 prevent the material poured into the textured area 101 from flowing into the non-textured area 103, until the height of the walls is exceeded. In the preferred embodiment, a first layer of material occupy the textured area 101 up to the height of the walls 104. As one skilled in the art will recognize, multiple layers could occupy the textured area 101.

Shown in FIG. 11, a first material 120 having a first characteristic is poured into the non-textured area 103 to form a first layer of material. Subsequent to the pour of the first material 120, a second material 140 is poured into the textured area 101 to form a first layer of the second material 140. The layers of material both first and second, are generally co-planar, although it is not necessary. Subsequently, a third material 123 is poured over the entire mold, thus overlaying the first material 120 and the second material 140 in such a fashion, a layered panel is produced, as previously discussed, each layer of material or each pour of material can have different characteristics. When layered as to described in a mold for a backbone panel 25 as shown in FIG. 10, the result is a central portion of the panel having a first physical characteristic, such as texturing, and the remaining portions of the panel having no texturing. As previously discussed, variations are endless.

With reference to the mold shown in FIG. 11, a particularly useful layup of material may be used to create the backbone panel for a clamshell phone case. For the first layer, a material having a first elastic characteristic is poured in the first region, such as textured area 101. A second material having a second elastic characteristic is poured into a second region, such as non-textured area 103. A third pour of the second material is then poured to cover both of the previous layers of material, thereby connecting them. One skilled in the art will recognize a third material, or the first material, can be used for the third pour. Additionally, the characteristic need not be elasticity, but may be selected from the group of color, texture, additive suspended in the material, heat resistance or melting point.

Once the desired materials are poured and cured, the co-molded panel is removed from the mold and sewn or otherwise attached to other panels to produce the case.

In other embodiments, the co-molding process allows other structures to be placed or integrated into the panel. For instance, once the first substance 120 is poured, additional materials can be placed into the mold, to create a panel having areas with different characteristics. The materials may be the same substance, or include a second substance 140 for co-molding, or may include other materials or structures, such as scrims, reinforcements, or windows, judiciously placed within the mold to create areas having particular structural characteristics.

For instance, a scrim 130 or other woven or non-woven reinforcement may be placed in areas where there will be stitching during the assembly of the case. Such scrims are placed where the panel will be stitched to lesson the likelihood of the stitching pulling through the case material. Similarly, a scrim can be placed in the area of the aperture for the clip post, thereby reinforcing that area. In other embodiments, the window 48 is placed in the mold prior to the second material pour, thereby eliminating the need to stitch the window 48 in place, as the window will be co-molded between the first material and the second material, and thereby retained. In another example shown in FIG. 18, reinforcement patches 132 are placed in areas of high wear, such as edges, prior to the first pour. In other embodiments, an elastic panel is placed to connect the two pocket portions, thereby forming a portion of the continuous or backbone panel 25. These advantages can result in significant economies during manufacture which are not possible if the material is created as a sheet, and then cut to size to form the case. If such additional structures are to be included, it is preferable that the structures are placed in the mold 100 after at least one pour has taken place, and the structure is placed over at least part of the pour, so that the structure is retained between the first and later layers of materials, However, such placement depends on the structure. The reinforcement patches 132, may be exposed on the exterior of the panel, and hence should be in the mold prior to the first pour.

In other embodiments, and as a direct result of co-molding process, portions of a panel can be thicker or thinner than other sections. For instance, areas where the finished product will include stitching can easily be made thicker to prevent pull through. Other areas, such as the textured area of the mold in FIG. 11, or areas where the panel fits over an edge of the phone, may be thinner to provide less bulk. In other embodiments, portions of the case that fit edges of the phone may be thicker to provide impact protection.

In additional to the layers shown in the figures, a final lining material such as rayon, may be applied either by spraying or laminating, onto the last poured layer. The lining material allows the cellular phone, or other portable device, to easily slide into and out of the case.

Figure 29:
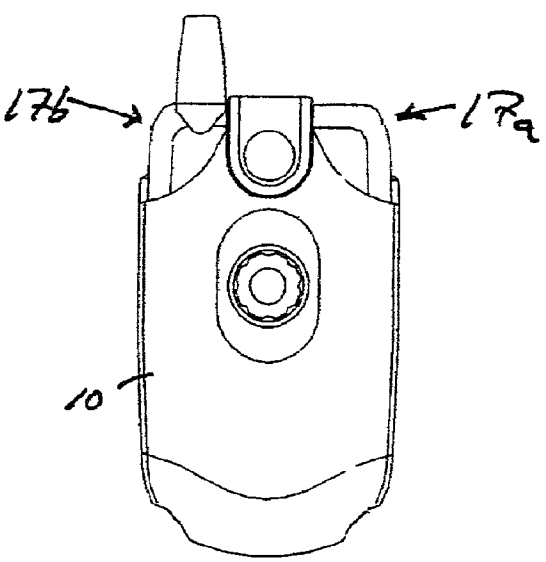
FIG. 29 is a rear view of a cell phone in a cell phone case including corner protection.
Figure 30:
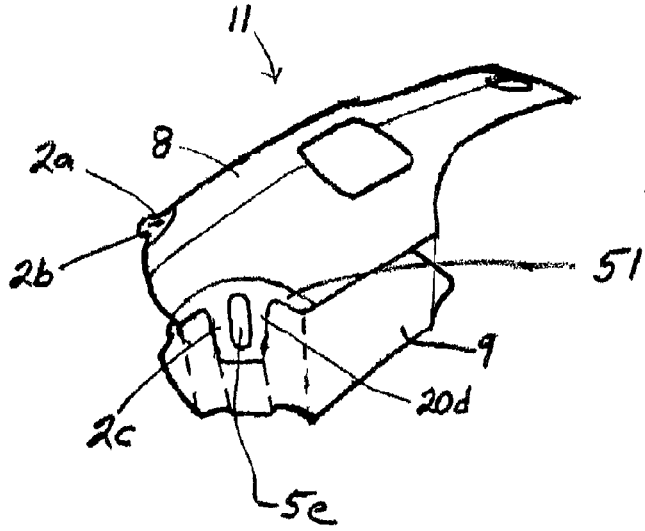
FIG. 30 is a perspective view showing an exploded view of two panels prior to forming a pocket of a cell phone case.
Figure 31:
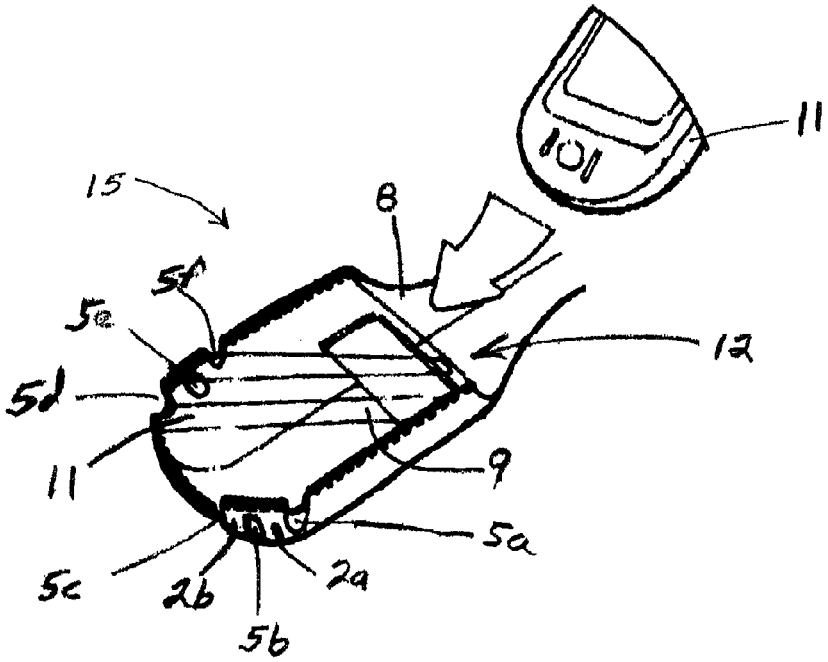
FIG. 31 is a diagram showing a typical construction of a cell phone case showing panels of material assembled to form a pocket and a cell phone being inserted into the pocket.

With reference to FIGS. 27-31, a cell phone 11 is shown inside a cell phone case 10. One skilled in the art will recognize the cell phone case 10 as being formed, as shown in FIGS. 30 and 31, of sheets of material 8 and 9 which are attached about portions of their perimeter to form a pocket 12 for the cell phone 11 or other electronic device, as shown in FIG. 30. Such cell phone cases are known in the prior art, and also described in the previous paragraphs of this application. The case of the present invention could also be a clamshell case as shown in FIGS. 1-9, and 27-29, or a non-clamshell case.

Figure 26:
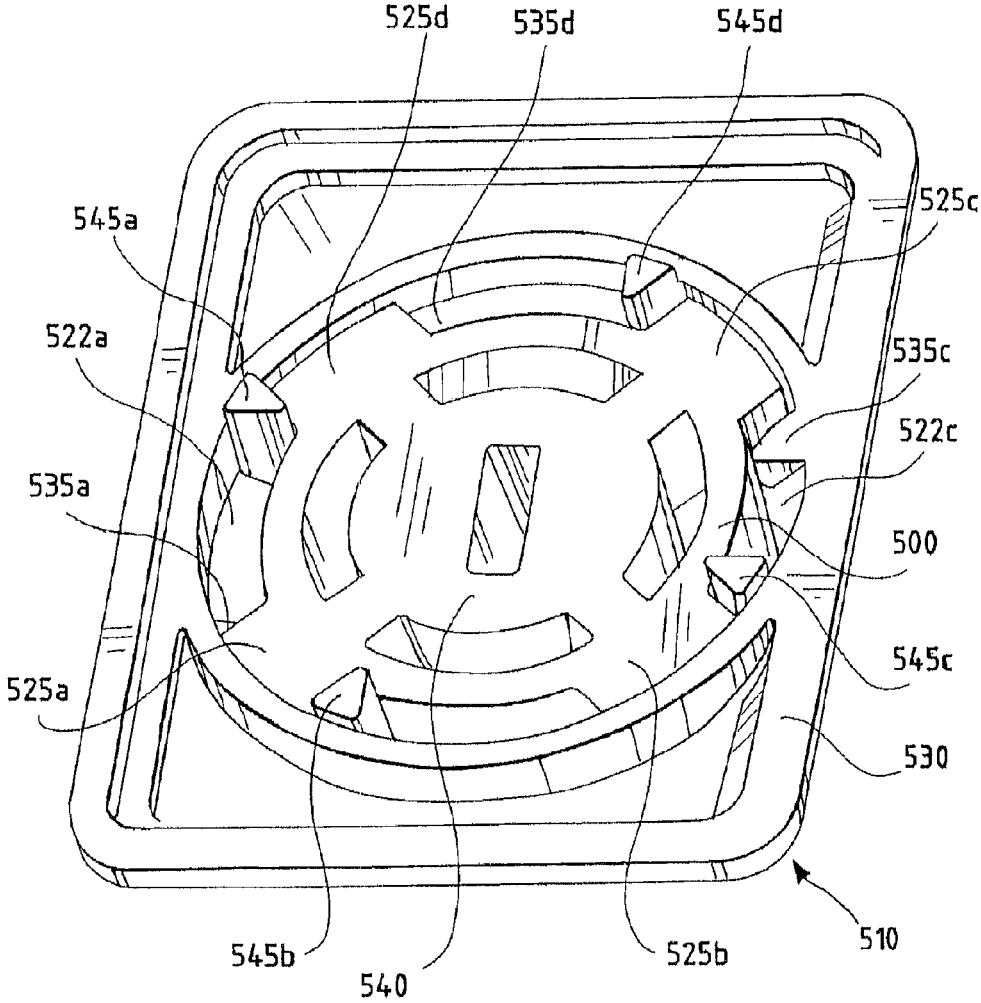
FIG. 26 is a bottom perspective view of a bayonet mount post and retainer.
Figure 28:
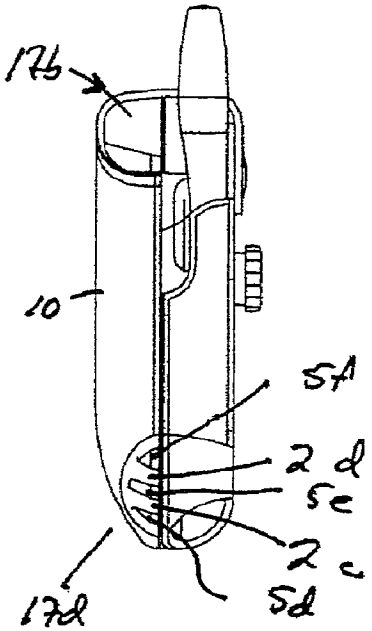
FIG. 28 is a side view of a cell phone in a cell phone case including corner protection.
Figure 27:
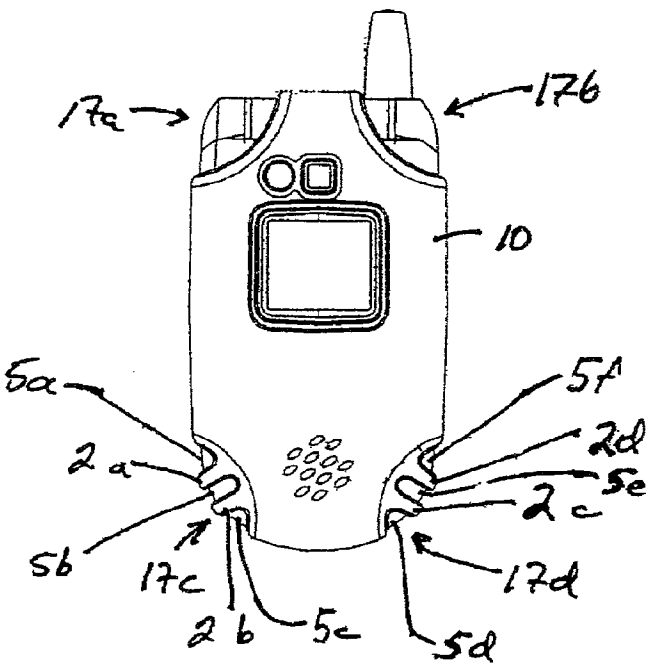
FIG. 27 is a front view of a cell phone in a cell phone case including corner protection.

As shown in FIGS. 26-28, the cell phone case 10 includes open areas 17 a-d at the corners of the cell phone case 10. 17a and 17b are completely open, and do not offer protection to the corners of the cell phone 15.

Areas 17c and 17d include strips of material 2a-d, which divide the open areas 17c and 17d and provide some material over the otherwise exposed corners of the cell phone 11. Defined another way, open areas 17a and d include strips of material 2a-d, thereby defining a plurality of apertures 5a-f. One skilled in the art will recognize the number of apertures can be varied. For example, the open areas 17c and d could include netting, or strips of material placed in different directions.

As shown in FIG. 29, the strips of material 2c and d are part of the first panel of material 8. The strips of material 2a-d need not be of the same material as the first panel 8. The strips, or other structures placed at the corners of the case, thereby protecting the corners of the electronic device in the case, can be of a different material, preferably one that will protect the device in the case from impact. Similarly, the strips of material, or other structures forming the corner protectors need not be part of the first panel 8. The strips of material or corner protectors can be part of the second panel 9 or any other panel.

For example, a co-molding process, such as described previously herein, could be used to place protective structures, such as strips, molded corner protectors, netting, or other structures, at the corners of the case. These structures can be thicker than the sheets of material 8 and 9 forming the walls of the case 10, to allow for more protection to the corners. For instance, with reference to FIG. 30, the corner area 51, including strips of material 2c and d, can be of a thicker material than the sheet of material 8. Similarly, corner area 51 can be of a thinner material to reduce bulk. The material comprising corner area 51 can be attached to the sheet of material 8 by any known means, such as sewing, heat welding, adhesive, or more preferably, co-molding. In other embodiments, a preformed corner structure can be co-molded to the sheet of material 8 during manufacturing.

Is an alternate embodiment, reinforcement members or other preformed structures, that is structures molded to the contours of the case, are placed within the open areas and secured to the material or panels of the cell phone case 10 to provide protection at the corners of the electronic device or cell phone 11. Because the structures are molded or formed, they can be made of a specific thickness that is different than the panels forming the case 10.

The case 10, no matter how produced, can include a detachable clip 200. With reference to FIGS. 1-5, the detachable clip 200 is affixed to the case 10 by a post 210. Indeed, the detachable clip 200 and post 210 can be incorporated into many different cases, not just the clamshell case 10 depicted in the Figures. This arrangement of clip and post is well known in the prior art. The post 210 includes a base 212 and an outwardly extending lug 214. The detachable clip 200 attaches to the lug 214, allowing the user to securely attach the case to his clothing.

The post 210 is removably attached to the case 10. The case 10 includes an aperture 216 sized to allow the lug 214 to fit through yet is not large enough to allow the base 212 to pass. The post 210 is positioned so that the lug 214 extends outwardly away from the case 10, and the base 212 remains in the case 10, the base 212 being too large to fit through the aperture 216. The base 212 is retained in position by a retainer 220, the retainer 220 limiting movement and securing the base 212 when engaged. When disengaged, the retainer 220 allows the post 210 to be removed from the case 10.

In the preferred embodiment, the base 212 is a generally thin, flat member, having a perimeter including two parallel straight portions 222 and two curved portions 230. The retainer 220 is slightly thicker than the base 212, and includes a recess 225 to receive the base 212. The recess 225 may go entirely through the retainer 220 as an aperture. The perimeter of the recess 225 is generally concentric with the perimeter of the base 212. The retainer 220 includes tabs 226 which extend over the base 212, to keep the base 212 from moving in a direction perpendicular to the base 212. In the preferred embodiment, the tabs 226 are located to extend over the curved portions 230 of the base 212. The retainer 220 is attached to the inside of the case 10 so that it is located about the aperture 216. The retainer 220 is attached to the case by any means known in the art, including stitching, heat weld, and adhesive. The retainer 220 could also be co-molded into the case 10, or formed as part of the case.

In use, the post 210 is attached to the case 10 by inserting the lug 214 into the aperture 216 from the inside of the case. The retainer 220 is convexly flexed to allow the curved portion 230 of the base 212 to be inserted under a tab 226. Once positioned, the retainer 220 is unflexed and the opposite curved portion 223 is allowed to snap under the remaining tab 226, thereby securing the base 212 between the case 10 material and the tabs 226.

To remove the post, the retainer 220 is again convexly flexed to snap base 212 over the tab 226, allowing the base to be disengaged from the retainer 220 and the lug 214 to be pushed through the aperture 216, thereby removing the post 210 from the case 10. In such a fashion, the post 210 may be selectively attached to the case, or removed, as desired by the user.

One skilled in the art will recognize other structures could be used to connect a post to a retaining structure on the case. An example of such an embodiment includes a retainer 240 and base 250 that include mating structures that allow the base 250 to be separated and reconnected to the retainer 240.

Figure 20:
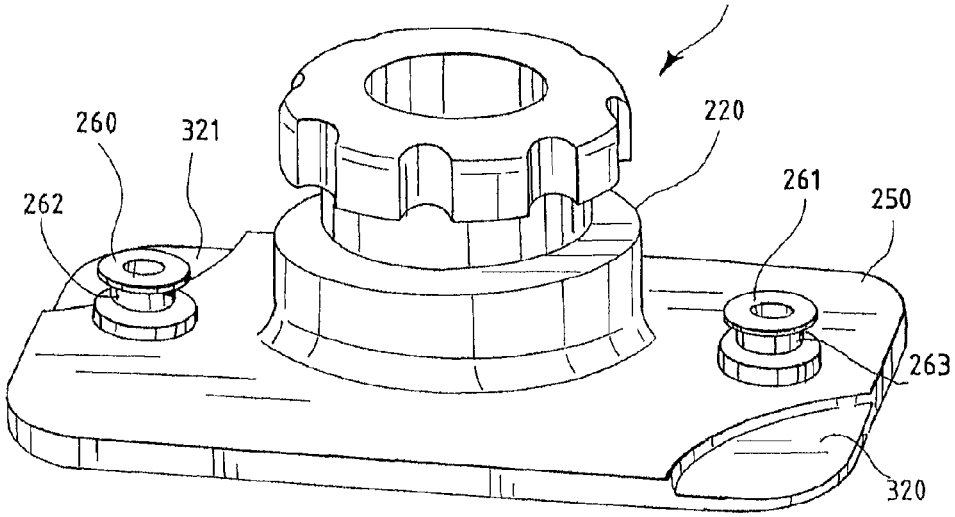
FIG. 20 is a perspective view of an alternate embodiment of a base.

In the embodiment shown in FIG. 20, the base 250 includes a plurality of shafts 260 and 261 extending from the base 250 on the same side of the base 250 as the lug 270. The shafts 260 and 261 are preferably positioned on either side of the lug 270 at a distance sufficient to allow of a mating structure on the retainer 240 to secure the shafts 260 and 261. In the embodiment shown in FIG. 20, the shafts include a recessed portion 262 and 263 for interacting with complimentary structure on the retainer 240, to allow the post 310 to be attached and unattached from the retainer 240.

Figure 21:
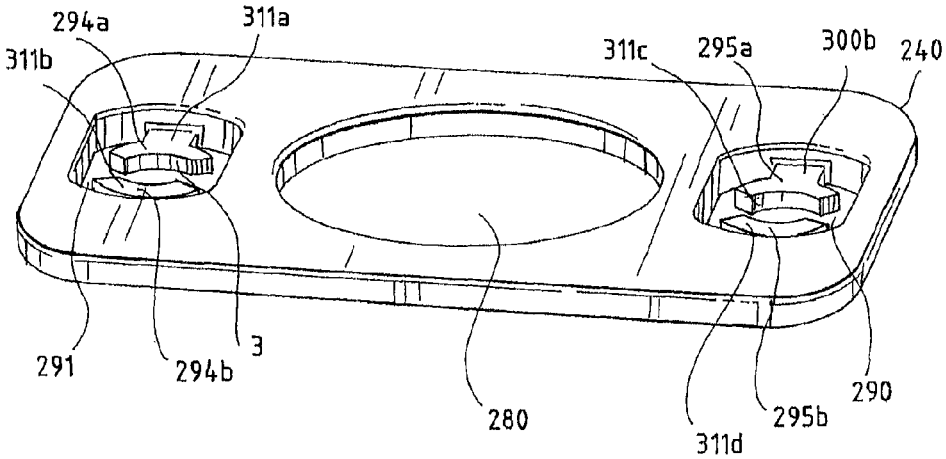
FIG. 21 is a perspective view of an alternate embodiment retainer and base with a rectangular aperture.
Figure 22:
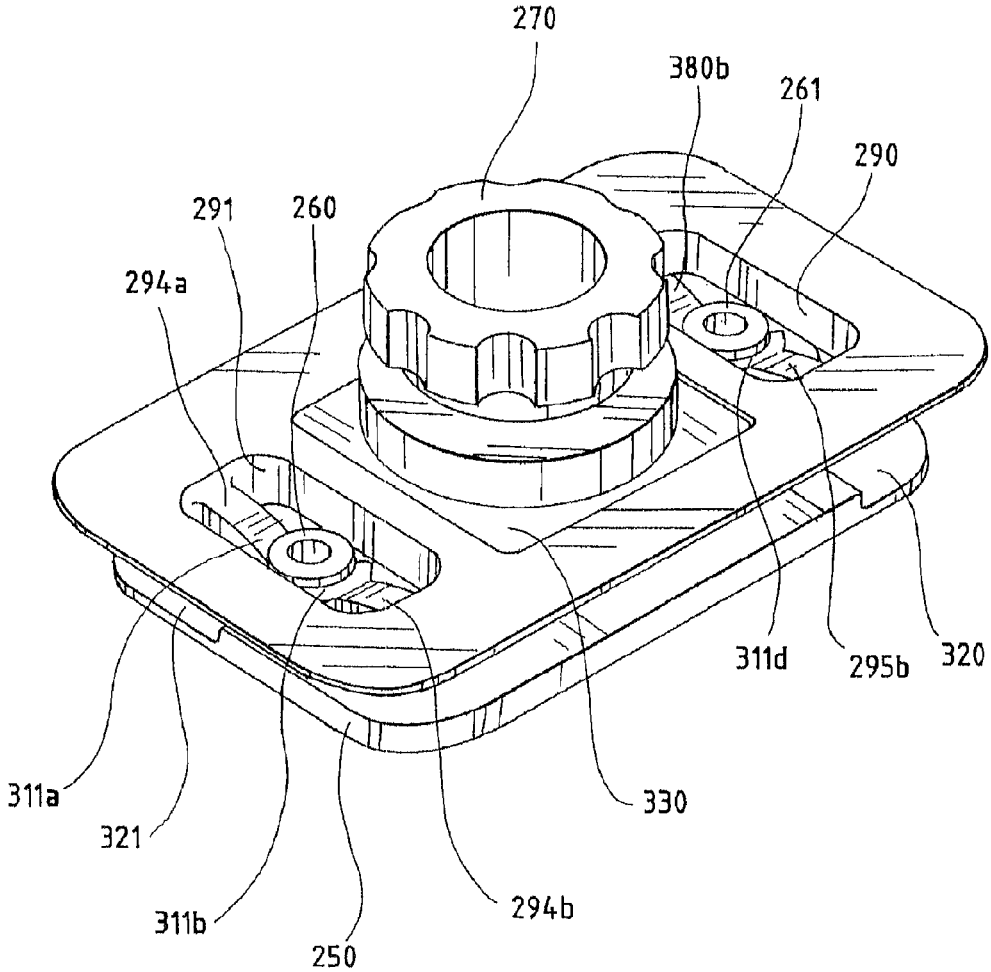
FIG. 22 shows a post including a lug with a non-circular portion.
Figure 23:
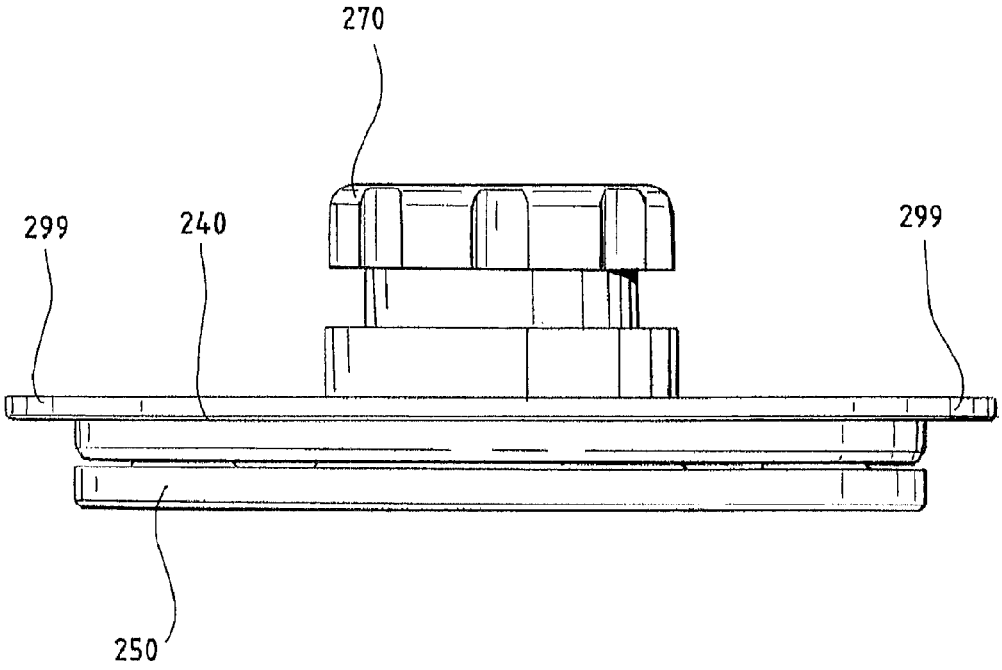
FIG. 23 is a side view of a post and retainer in a secured relationship.

The retainer 240 includes an aperture 280 sized to allow the lug 270 to pass through. As shown in FIGS. 20 and 21, the aperture 280 is round. The aperture 280 may be any shape so long as the lug 270 can pass through as shown in FIGS. 22 and 23. Although it is preferred that the aperture 280 take a perimeter shape similarly shaped and sized to the lug 270, such correspondence is not necessary. The outer perimeters of the base 250 and the retainer 240 are generally co-extensive, although either structure may be larger or smaller than the other. In instances where the base 250 perimeter extends beyond the perimeter of the retainer 240, the portion of the base 250 extending is raised so as to form a lip about portions of or about the entire perimeter of the retainer 240.

The base 250 can also include separation recesses 320 and 321 at its perimeter. The separation recesses are areas exposed to the perimeter that are of reduced thickness. When the base 250 and retainer 240 are mated, the separation recesses allow space between the two structures to allow a fingernail or other object to lever the two structures apart.

The retainer 240 includes a plurality of receivers 290, 291 for receiving and engaging the shafts 260 and 261. In the embodiment shown in FIGS. 20 and 21, the receivers 290 and 291 include members or tabs 294 a and b and 295 a and b to engage the recessed portions 263 and 262 of shafts 260 and 261 when the shafts 260 and 261 are inserted into the receivers 290 and 291. In the embodiment shown, the tabs 294 a and b and 295 a and b include a resilient portions 300 a-d attached to the retainer 240. The resilient portions 300 a-d flex to allow arc portions 311 a-d to slide over the distal end of the shafts 260 and 261 and seat in the recesses 262 and 263. One skilled in the art will recognize that other types of arranged could be used to secure the posts 260 and 261 to the retainer 240.

In an alternate embodiment shown in FIG. 22, the aperture 280 in the retainer 240 is rectangular. Additionally, the lug 270 includes a portion 330, which is shaped to compliment and fit inside of aperture 280. Such engagement prevents or reduces relative movement between the retainer 240 and base 250 in a direction parallel to the major plane of the retainer 240, thus reducing forces applied to the receiver 291 and 290, which might cause undesired separation of the base 250 from the retainer 240. One skilled in the art will recognize other non-circular shapes will also accomplish the same stability and prevent rotation of the lug 270 in the aperture. FIG. 23 also shows a retainer 240 with a perimeter flange 299.

Figure 24:
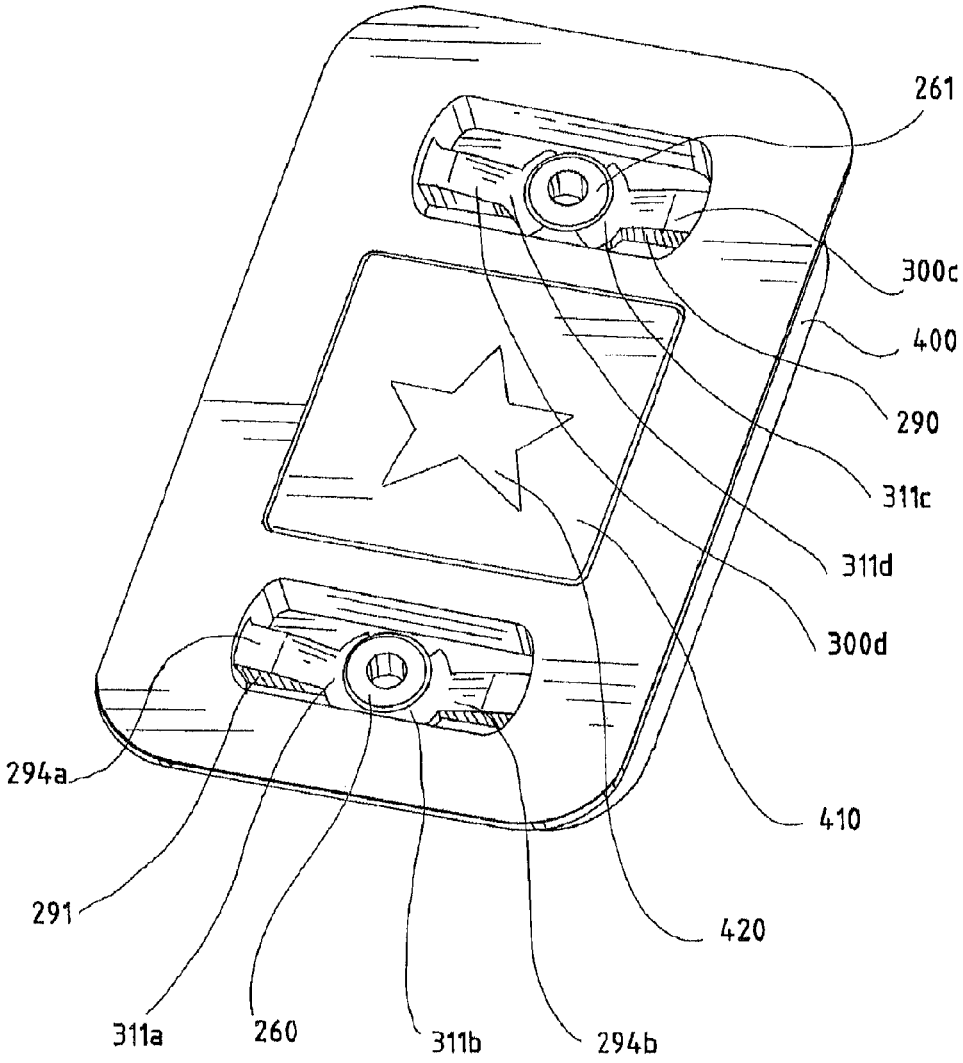
FIG. 24 is an alternate base without a post.

As shown in FIG. 24, an alternate base 400 includes a raised portion 410, but does not include a lug or post for attachment of a clip. Such a base 400 is used to occupy or otherwise obstruct the aperture 280 when the base with the lug is removed. Use of the alternate base 400 thus renders a case without the projecting lug or post, resulting in a generally smooth case. The portion of the base 400 visible through the aperture 280 can include indicia 420 such as advertising, logos, or other indications of sponsorship.

Figure 25:
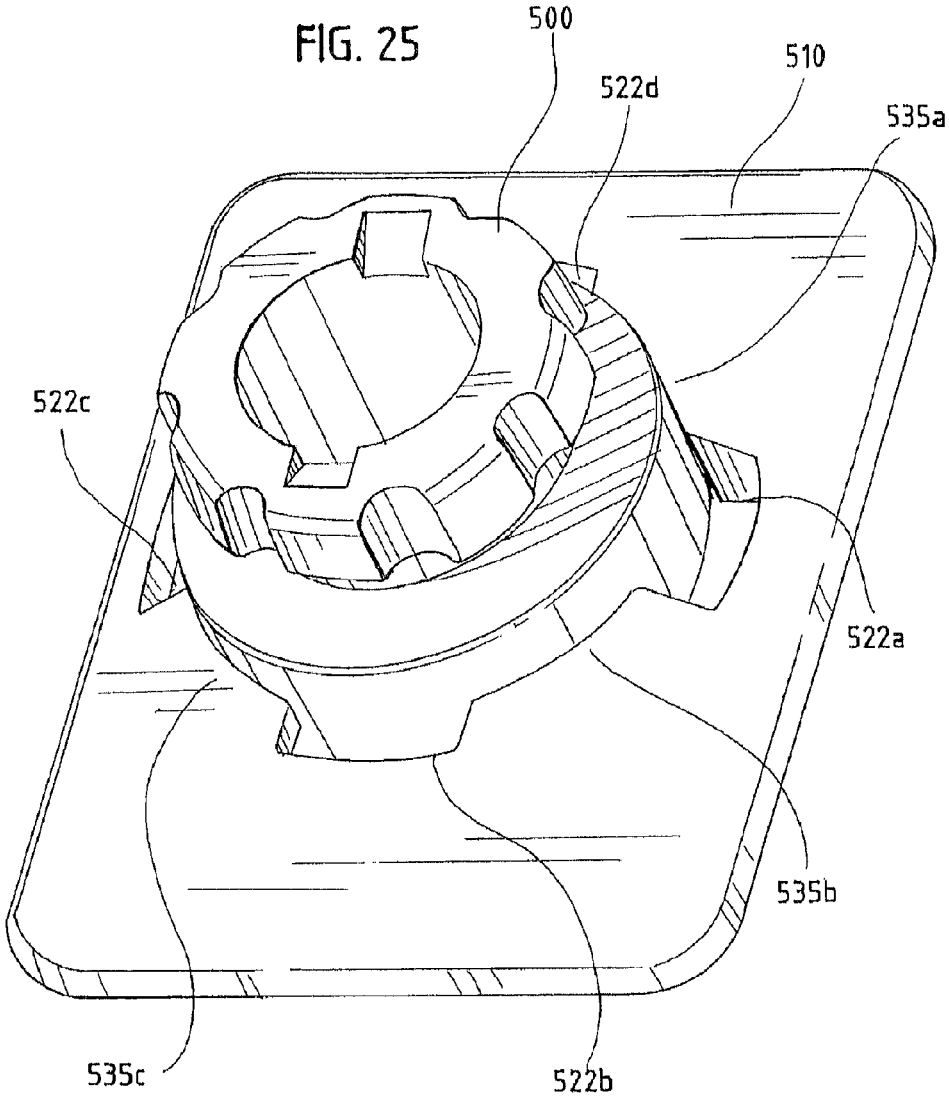
FIG. 25 is a perspective view of a bayonet mount post and retainer.

One skilled in the art will recognize that other types of constructions may be utilized in attaching the post to the case. One such constructive is a bayonet mount, as shown in FIGS. 25 and 26. The post 500 is attached to a mounting base 510. The mounting base 510 includes an aperture having a plurality of notches 522 a-d about its perimeter. The notches 522 a-d are sized and spaced so as to accept projections 525 a-d position about the bade of the post 500. The bottom 530 mounting base 510 is attached to the outside surface of the case by stitching adhesive, rivets, or other means of mechanical attachment. When attached to the outside of the case, the use of the bayonet mount allows the post 500 to be inserted and removed from the outside of the case. Thus, the case does not need an aperture.

In use, the post 500 is inserted into aperture base end 540 first, such that projections 525 a-d are inserted into notches 522 a-d. Adjacent notches 525 a-d are flanges 535 a-d. The flanges are generally arcuate in shape and form part of the aperture 520 perimeter, thus restraining the post 500 from side to side movement. The flanges 535 a-d are of a thickness less than the thickness of the base 510, so as to accommodate the projections 525 a-d when the post 500. The base 510 also includes stops 545 a-b on the flanges 535 a-b so that rotation of the post is stopped, preventing over rotation of the post 500.

The embodiments disclosed herein are illustrative of the invention and are not meant to limit the scope of the invention.

The invention claimed is:

1. A case for portable device, the case being formed of panels of material attached to form a pocket for receiving the device, the case including:

a first panel [of] *comprising a first polymer* material attached to a second panel [of] *comprising a second polymer* material to form a pocket for receiving the portable device, *the first material being a different material from the second material,* the case including a plurality of apertures at a corner of the device when the device is placed in the case, wherein the plurality of apertures are defined by strips of material extending across an open corner of the case, *the strips of material comprising one or more of the first material and the second material.*

2. The case of claim 1, wherein the strips of material are two in number.

3. The case of claim 1, wherein the strips of material defining the apertures extend from first panel and are attached to the second panel.

4. A case for a portable device, the case including:

a plurality of panels of *a polymer* material, the panels assembled to form a pocket for receiving the portable device, the pocket including a second *polymer* material incorporated into the pocket, the second material positioned to protect corners of the portable device when the device is in the case, wherein the second material is thicker than the material forming the panels.

5. The case of claim 4, wherein the second material is co-molded to at least one of the plurality of panels.

6. A case for a portable device, the case including, a first panel [of] *comprising a first polymer* material shaped to have strips of material extending therefrom, *and* a second panel [of] *comprising a second polymer* material, the first panel attached to the second panel to form a pocket having an opening for receipt of the portable device, the strips of material attached to the second panel to form part of the pocket, *the strips of material comprising one or more of the first material and the second material,* wherein the strips of material define a plurality of apertures.

7. The case of claim 6, wherein the strips of material are positioned near corners of the device when the device is in the case.

8. The case of claim 6, wherein the strips of material are co-molded to the first panel.

9. The case of claim 8, wherein the strips of material are thicker than the rest of the first panel.

10. The case of claim 6, wherein the strips of material are thicker than the rest of the first panel.

11. The case of claim 9, wherein the strips of material include an aperture.

*12. The case of claim 4, wherein the second material is thicker at the corners of the case than the panels forming the pocket.*

*13. The case of claim 4, wherein the material forming the panels is molded and allowed to cool before the second material is molded to at least one of the plurality of panels.*

*14. The case of claim 5, wherein co-molding the second material to the at least one of the plurality of panels comprises molding the material forming the panels, allowing the material forming the panels to cool, and molding the second material to the at least one of the plurality of panels.*

*15. A case for a portable device, the case comprising:*

*a pocket configured for receiving the portable device, the pocket comprising a first outer polymer material co-molded with a second inner polymer material, the first outer material being a different material from the second inner material;*

*wherein the first outer material has open areas at corners of the pocket; and*

*wherein the second inner material is positioned at the corners of the pocket within the open areas in the first outer material, and protect corners of the portable device when the portable device is in the case.*

*16. The case of claim 15, wherein the first outer material is more elastic than the second inner material.*

*17. The case of claim 15, wherein the first outer material is a different color than the second inner material.*

*18. The case of claim 15, wherein the first outer material is a different texture than the second inner material.*

*19. The case of claim 15, wherein the second inner material is thicker than the first outer material.*

*20. The case of claim 15, wherein the pocket comprises a plurality of panels formed from the first outer material.*

*21. The case of claim 15, wherein elasticity of the first outer material co-molded with the second inner material allows the case to give and fit the contours of the portable device.*

*22. The case of claim 15, further comprising a second pocket for further receiving the portable device.*

*23. The case of claim 15, wherein the portable device is a nonclamshell portable device.*

*24. A case for a portable device, the case comprising:*

*a pocket configured for receiving the portable device, the pocket comprising a first outer polymer material co-molded with a second inner polymer material;*

*wherein the first outer material has open areas at corners of the pocket;*

*wherein the second inner material is positioned at the corners of the pocket within the open areas in the first outer material, and protect corners of the portable device when the portable device is in the case; and*

*wherein the first outer material or the second inner material comprise one or more selected from the group consisting of silicone, a thermoset, a thermoplastic, PVC, EPE, and a polymer.*

*25. The case of claim 15, wherein the first outer material is allowed to cool before molding the second inner material to the first outer material.*

*26. A case for a portable device, the case comprising:*

*a first polymer material forming part of a pocket for receiving the portable device, the pocket having open areas at corners thereof through the first material; and*

*a second polymer material co-molded to the first material and positioned within the open areas to protect corners of the portable device when the device is in the case, the first material being a different material from the second material.*

*27. The case of claim 26, wherein the first material forms a plurality of panels to form the pocket.*

*28. The case of claim 26, wherein the first material is allowed to cool before molding the second material to the first material.*

* * * * *